(12) United States Patent
Continelli et al.

(10) Patent No.: US 7,249,113 B1
(45) Date of Patent: Jul. 24, 2007

(54) SYSTEM AND METHOD FOR FACILITATING THE HANDLING OF A DISPUTE

(75) Inventors: Judith Continelli, Glendale, AZ (US); Sandy Hazeltine, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 09/537,506

(22) Filed: Mar. 29, 2000

(51) Int. Cl.
*G06Q 99/00* (2006.01)

(52) U.S. Cl. .............................. 705/80; 705/67; 705/37; 705/1

(58) Field of Classification Search .................. 705/80, 705/8, 41, 67, 51, 69
See application file for complete search history.

(56) References Cited

U.S. PATENT DOCUMENTS

| | | |
|---|---|---|
| 5,334,823 A | 8/1994 | Noblett, Jr. et al. |
| 5,357,563 A | 10/1994 | Hamilton et al. |
| 5,386,458 A | 1/1995 | Nair et al. |
| 5,432,326 A | 7/1995 | Noblett, Jr. et al. |
| 5,479,530 A | 12/1995 | Nair et al. |
| 5,590,038 A | 12/1996 | Pitroda |
| 5,604,802 A | 2/1997 | Holloway |
| 5,649,117 A | 7/1997 | Landry |
| 5,668,953 A | 9/1997 | Sloo |
| 5,671,282 A | 9/1997 | Wolff et al. |
| 5,699,528 A | 12/1997 | Hogan |
| 5,826,241 A | 10/1998 | Stein et al. |
| 5,860,066 A | 1/1999 | Rouse |
| 5,874,717 A | 2/1999 | Kern et al. |
| 5,878,139 A | 3/1999 | Rosen |
| 5,895,450 A | 4/1999 | Sloo |
| 5,910,988 A | 6/1999 | Ballard |
| 5,991,733 A * | 11/1999 | Aleia et al. .................... 700/90 |
| 6,167,385 A * | 12/2000 | Hartley-Urquhart ......... 705/35 |
| 6,327,578 B1 * | 12/2001 | Linehan ........................ 705/65 |
| 6,330,551 B1 * | 12/2001 | Burchetta et al. ............. 705/80 |
| 6,336,095 B1 * | 1/2002 | Rosen ............................ 705/1 |
| 6,343,279 B1 * | 1/2002 | Bissonette et al. .......... 235/380 |
| 6,607,136 B1 * | 8/2003 | Atsmon et al. ............. 235/492 |
| 6,766,307 B1 * | 7/2004 | Israel et al. ................... 705/80 |
| 6,801,900 B1 * | 10/2004 | Lloyd .......................... 705/10 |
| 2002/0007362 A1 * | 1/2002 | Collins et al. ................. 707/5 |
| 2002/0082929 A1 * | 6/2002 | Wang et al. .................. 705/26 |
| 2004/0210540 A1 * | 10/2004 | Israel et al. ................... 705/80 |

\* cited by examiner

*Primary Examiner*—Firmin Backer
(74) *Attorney, Agent, or Firm*—Snell & Wilmer L.L.P.

(57) ABSTRACT

A system and method is disclosed for handling a credit dispute via an Internet connection. The system includes one or more terminals linked to a communication channel for fast Internet access, and a server having an associated web site for displaying a plurality of dispute handling forms. A party in dispute may access the web site from a terminal, choose an appropriate dispute handling form, provide data in the requested fields on the form, and transmit the form over the Internet connection to the server for processing. The server accepts a User ID and password from a user, retrieves and displays a set of dispute handling forms, receives input entered on the forms, routes the forms to a second user in dispute, and makes the forms available for viewing to the second user. The program may further index the data entered on the forms using a code-based method.

9 Claims, 12 Drawing Sheets

SYSTEM AND METHOD FOR FACILITATING THE HANDLING OF A DISPUTE

FIELD OF INVENTION

The present invention relates generally to a system and method for handling disputes and, more particularly, to a real-time dispute processing system and method for resolving transactional credit disputes.

BACKGROUND OF THE INVENTION

With increasing popularity, consumers worldwide are purchasing goods and services on credit. For many purchasers, the most convenient form of payment is a plastic card with a magnetic stripe, an embossed account number and/or a smart chip called a credit card (hereafter "card" or "cards").

Cards may be used at service establishments (S/Es) (e.g., automated teller machines (ATM), point of sale (POS), and instances when no card is required during the transaction such as purchases over the Internet) that have entered into agreements with an Acquirer for the S/E to accept cards from cardmembers to charge purchases of goods and services or for cash access. An Acquirer may be, for example, a non-financial or financial entity that specializes in the marketing, installation and support of POS card acceptance at S/Es. Acquirers generally negotiate a contract with the S/E to accept a brand of cards (e.g., AMERICAN EXPRESS®, VISA®, MasterCard®, DISCOVER CARD®.

Card Issuers are typically banks and other financial organizations (e.g., Bank of America®, Citibank®, MBNA America®, Chase Manhattan Bank®) operating under the regulations of a card issuing association or entity. The cardmember enters into an agreement and establishes a card account with the Issuer. The Issuer's name generally appears on the card and cardmember's payments are typically sent to that Issuer.

Occasionally cardmembers may receive unsatisfactory goods or services from the S/E, be involved with a dispute over price with the S/E, or the S/E may have failed to comply with the regulations and/or terms of its card acceptance agreement with the Acquirer. Typically the cardmember then notifies the Issuer about the dispute with the S/E, which prompts the Issuer to begin a dispute resolution process with the Acquirer on behalf of the cardmember.

In order to substantiate the dispute claim of the cardmember, the Issuer may first make a "retrieval request" to the Acquirer. The receipt for a cardmember's purchase or credit transaction containing the details of any transaction carried out at the S/E is called the record of charge (ROC). A retrieval request may include a request for either an original ROC, a legible reproduction of the ROC, or any other transactional documentation from the Acquirer. The documentation supplied by the Acquirer in reply to a retrieval request is called "fulfillment."

A typical "chargeback" is a reversal of a credit transaction which is "charged-back" to the Acquirer from the Issuer. The Acquirer may refute the chargeback and process a "second presentment" to the Issuer with additional documentation. A "final chargeback" by the Issuer to the Acquirer occurs if the Issuer refutes the "second presentment" by providing additional documentation.

The aforementioned dispute handling process between Issuers and Acquirers is largely a manual documentation gathering process. Each step, beginning with the retrieval request, requires copying, mailing or faxing documentation. Communication between the Issuer and Acquirer is on-going until the dispute is settled. The entire manual process may consume valuable employee time and resources. Further, while the dispute is being settled, the charge remains pending on either the cardmembers account or on unreconciled billings.

Accordingly, there exists a need for a credit dispute system and method that increases the efficiency of the process. More particularly, there is a need for a system and method of processing a credit dispute that allows an initiator (such as an Issuer) to begin a dispute process by, for example, initiating a retrieval request to a responder (such as an Acquirer), then allowing the responder to fulfill the request in a real-time processing environment.

SUMMARY OF THE INVENTION

The present invention overcomes the problems outlined above and provides an improved system and method for facilitating, processing and retrieving documentation for the handling of a credit dispute between an initiator and a responder. In particular, the present invention provides a real-time dispute processing system that uses the speed and efficiency of the Internet, or similar communication system, to facilitate the handling of credit disputes.

In an exemplary embodiment, the system includes one or more access terminals having display and input capabilities. Each terminal is suitably linked to a communication channel for fast Internet access. A web site for displaying a plurality of dispute resolution forms is stored in a central server having a computer program stored thereon. Parties in dispute may access the web site via an Internet channel. Dispute forms may be viewed on the terminal display and completed by any suitable terminal input means. A document scanning device may be coupled to the terminal to provide image scanning of supporting documents to associate with the form.

An exemplary method of the present invention includes at least one access terminal for accessing an Internet web site, and a server which stores the web site having a plurality of dispute handling forms stored thereon. The user can access the web site, choose the appropriate dispute form and respond to all requested fields on the form. Upon completion, the user can send the form to the server for processing and subsequent transmission to a second user.

In an exemplary embodiment, the method further includes scanning supporting documents at a document scanning device. The user may transmit the scanned documents along with the form to the server for subsequent transmission to a second user. Thus, parties can route dispute resolution forms via the Internet and eliminate the time consuming efforts of mailing or faxing forms and documentation.

In yet another embodiment, a computer-based method for routing dispute forms via the Internet is implemented. A central site includes programming for prompting an end-user site for a User ID and password, and for displaying a set of dispute handling forms in response to the entered ID. At the end-user site, further programming is coded for collecting data on the forms and transmitting the form to the central site. The central site suitably receives the form and further includes programming for indexing the form based upon the collected data. The form is transmitted to a second end-user site and made available for viewing. A fast and efficient automated routing system may be realized by indexing forms based upon timeframes or any other suitable indexing method, to effectively reduce the dispute settling time.

BRIEF DESCRIPTION OF THE DRAWINGS

These and other features, aspects, and advantages of the present invention will become better understood with regard to the following description, appended claims, and accompanying drawings where:

DETAILED DESCRIPTION OF PREFERRED EMBODIMENTS

The present invention relates to an improved system and method for facilitating the handling of credit disputes using a real-time dispute processing system. Although the system may be suitable for a variety of dispute processing applications, (e.g., customer billing disputes, disputes requiring the exchange of information between customers and vendors or creditors) the present invention is conveniently described with reference to the credit disputes between Issuers and Acquirers.

Figure 1:
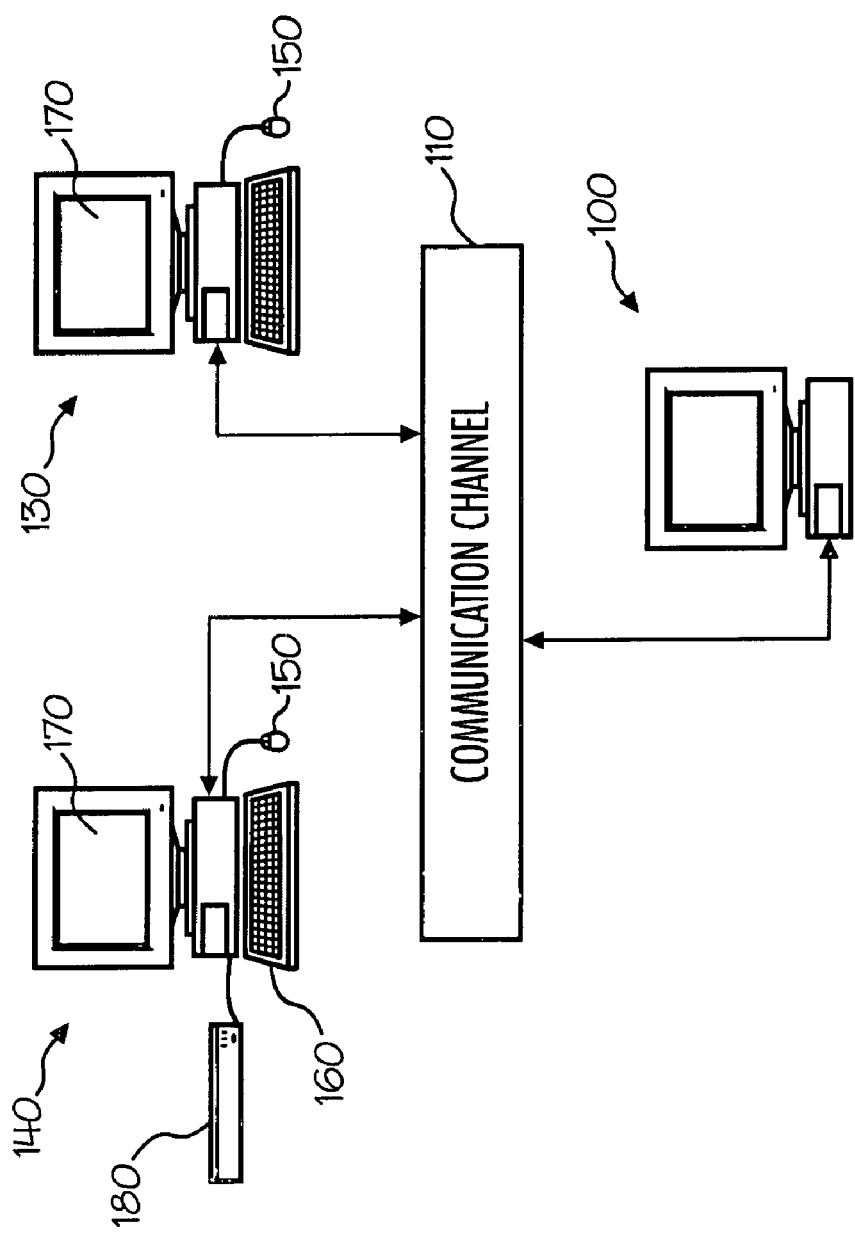
FIG. 1 illustrates a real-time dispute processing system in accordance with the present invention.

In an exemplary embodiment, the Internet-based processing system of the present invention is illustrated in FIG. 1. One skilled in the art will appreciate that the system may also operate on an intranet, extranet, or a device to use on a communication system, such as a personal digital assistant (PDA), smart phone, or any other suitable communication device. A central server 100 having a web site stored thereon is linked to an Internet communication channel 110. Central server 100 maintains an operating computer program for the web site.

Exemplary internet or intranet (depending on the user access channel) capable terminals 130 and 140 are provided for end-users to access the web site via communication channel 110. Each terminal 130 and 140 is preferably equipped with a display 170 and an input means. As an example, display 170 may be a terminal screen or any other suitable display. Data is entered by the user with any known data input means. As shown, terminals 130 and 140 are equipped with a point and click input means (a "mouse") 150 and a keyboard input means 160. Input means 150 and 160 are merely an example and not intended to limit the scope of the invention. Terminals 130 and 140 are preferably personal computers including but not limited to, a PENTIUM® PC, and include a minimum of 32 MB RAM, a 28.8 baud rate modem or company LAN (local area network) access, and 400 MB of available disk space on a local hard drive or network. Preferably, terminals 130 and 140 include a compression software such as WINZIP® 7.0 or greater, an operating program such as WINDOWS 95® or WINDOWS NT®, and an application such as WINDOWS EXPLORER® 4.0 with update version Service Pack 1 or greater, or NETSCAPE NAVIGATOR® version 4.07 or greater.

Additionally, the system may include a document scanning device 180. As shown in FIG. 1, terminal 140 is coupled to a scanning device 180. Terminal 130 can also be coupled to a similar scanning device. Scanning device 180 preferably has a resolution of at least 600 dpi. Supporting documentation is suitably transformed into computer readable format by scanning device 180. For example, an end-user operating scanning device 180 can scan receipts, rental agreements, hotel folios and the like, and then store the scanned data on the hard drive of terminal 140. Such supporting documentation can then be transmitted to server 100.

An exemplary method of the present invention may be executed in a network computer system with a computer program that controls the operation of server 100. The computer program may be suitably stored on server 100 by methods common to one skilled in the art, such as, for example, in the read-only-memory (ROM) or the hard drive memory of server 100. An exemplary network computer system of the present invention is illustrated as FIG. 1.

User Access

Figure 2:
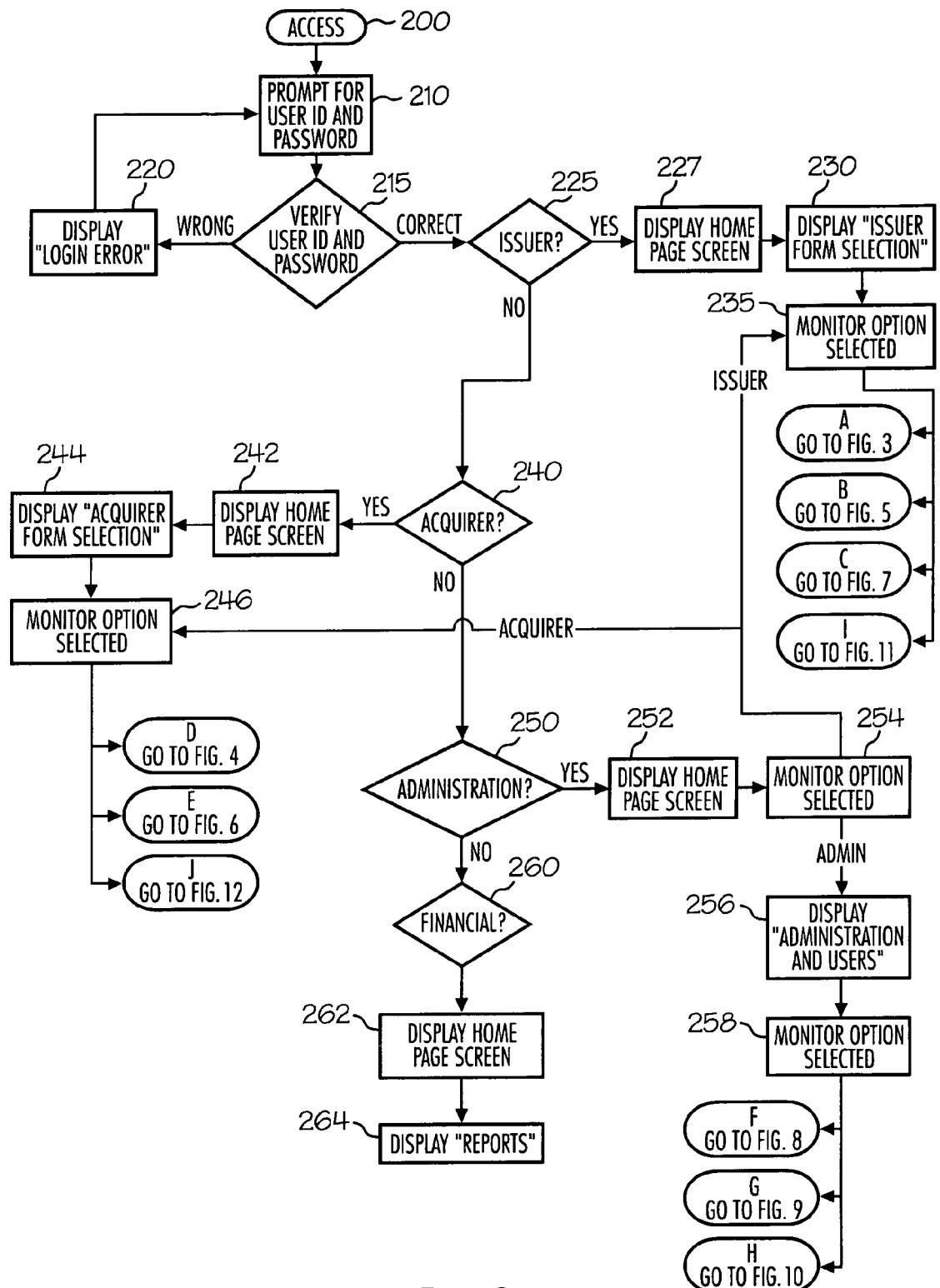
FIG. 2 a computer program flow chart illustrating a preferred embodiment for accessing the system of the present invention.

FIG. 2 summarizes the steps performed by the computer program while executing one exemplary method of the present invention. These steps are merely illustrative and can be modified or adapted. Users, which may include Issuers, Acquirers, administrative and financial personnel, complete a User ID request and receive a User ID and password. User IDs and passwords are unique to specific users and are stored on the server database. A first end-user, for example an Issuer, accesses the web site (step 200) by any known Internet browser means such as MICROSOFT INTERNET EXPLORER® or NETSCAPE NAVIGATOR®.

After accessing the web site, the program stored on server 100 is configured to prompt the end-user (e.g., terminals 130 and 140) for a User ID and password (step 210). Once the Issuer, or any user, has been authenticated by matching the entered User ID and password with a database located on the server (step 215), the Issuer will be presented with only those functions the Issuer is authorized to use (e.g., Issuers may be presented with only Issuer functions and Acquirers may be presented with only Acquirer functions). If the User ID and password do not correspond to a known (stored) User ID and password, the program displays a "Logon Error" message (220) and returns to the previous screen (step 210).

The program is configured to respond to the entry of the User ID and password with a set of queries to determine what type of user has been verified (e.g., Issuer, Acquirer, administration, financial). If the entered User ID and password correspond to an Issuer (step 225), the program causes the "home page" to display (step 227). In general, "home page" is a term used in the industry to indicate a main or central screen from which the user can select options. One skilled in the art will recognize that "home page" options may be included throughout a routine or sub-routine to allow the user to return to the main or central screen at any time and start over with another routine. From the home page, the Issuer chooses the option to begin a dispute handling process and the program causes the display "Issuer Form Selection" (step 230).

If the entered User ID and password do not correspond to an Issuer, the program is configured to query if the entered data is for an Acquirer (step 240). In a similar manner as described for the Issuer, if the user is an Acquirer, the home page is displayed (step 242) and the program causes the display "Acquirer Form Selection" (step 244). Because the User ID and password are unique for each type of exemplary user (Issuer, Acquirer, administration, financial), the program is configured to determine what type of user is accessing and to continue if the entered data is for neither an Issuer or an Acquirer.

Administrative personnel (AP) perform such functions as issuing User IDs and passwords or any other administrative function which may be needed to provide "system service" to other users (e.g., add, delete, modify User IDs). If the entered User ID and password correspond to AP (step 250), the home page screen is displayed (step 252). It is desirable to give AP access rights to both Issuer, Acquirer and administrative functions and/or forms. Often, AP initiate a dispute or respond to a dispute instead of the Issuer or Acquirer. In other words, AP can access the forms available to an Issuer or an Acquirer and complete the forms on behalf of and at the direction of the Issuer or Acquirer. AP are given an option (step 254) from the home page screen to choose "Dispute Handling," which gives AP the option of either Issuer forms or Acquirer forms, or to choose "Admin." The "Admin" option causes the program to display the "Administration" screen which contains a list of all active and inactive users that have been assigned a User ID and password (step 256). The AP can choose a function from the "Administration" screen and the option is monitored by the program (step 258).

In the exemplary embodiment as described above, if the entered User ID and password does not correspond to any of the above types of users, the user is financial personnel (FP) (step 260). (Step 215 verifies that the User ID and password corresponds to a single type of user; only one user type is remaining). The FP perform settlement and funds exchange between the other users, namely Issuers and Acquirers. The program causes the home page to display (step 262). FP may be given limited access to reporting functions and the like, or similar functions which enable FP to settle funds. For this reason, FP may be given a single option to choose from off the home page. In one exemplary embodiment, the option is reporting and the program causes the display "Reports" (step 264).

Upon display of the "Form Selection" screen for either the Issuer or the Acquirer, the program monitors the response of the user for one of the options presented on the display (step 235) (step 246). In an exemplary embodiment, the program causes a display which allows the user to choose from dispute handling forms.

In practice, the Issuer is typically notified by a cardmember that there is an unresolved dispute with the S/E, for example, the cardmember may have received unsatisfactory goods or services or there may be a discrepancy in the price paid. The Issuer then begins the dispute handling process with the Acquirer on behalf of the cardmember. Once the Issuer is authenticated by the program, and the "Issuer Form Selection" menu is displayed, the Issuer may begin the process by completing an on-line retrieval request form.

Retrieval Request

Figure 3:
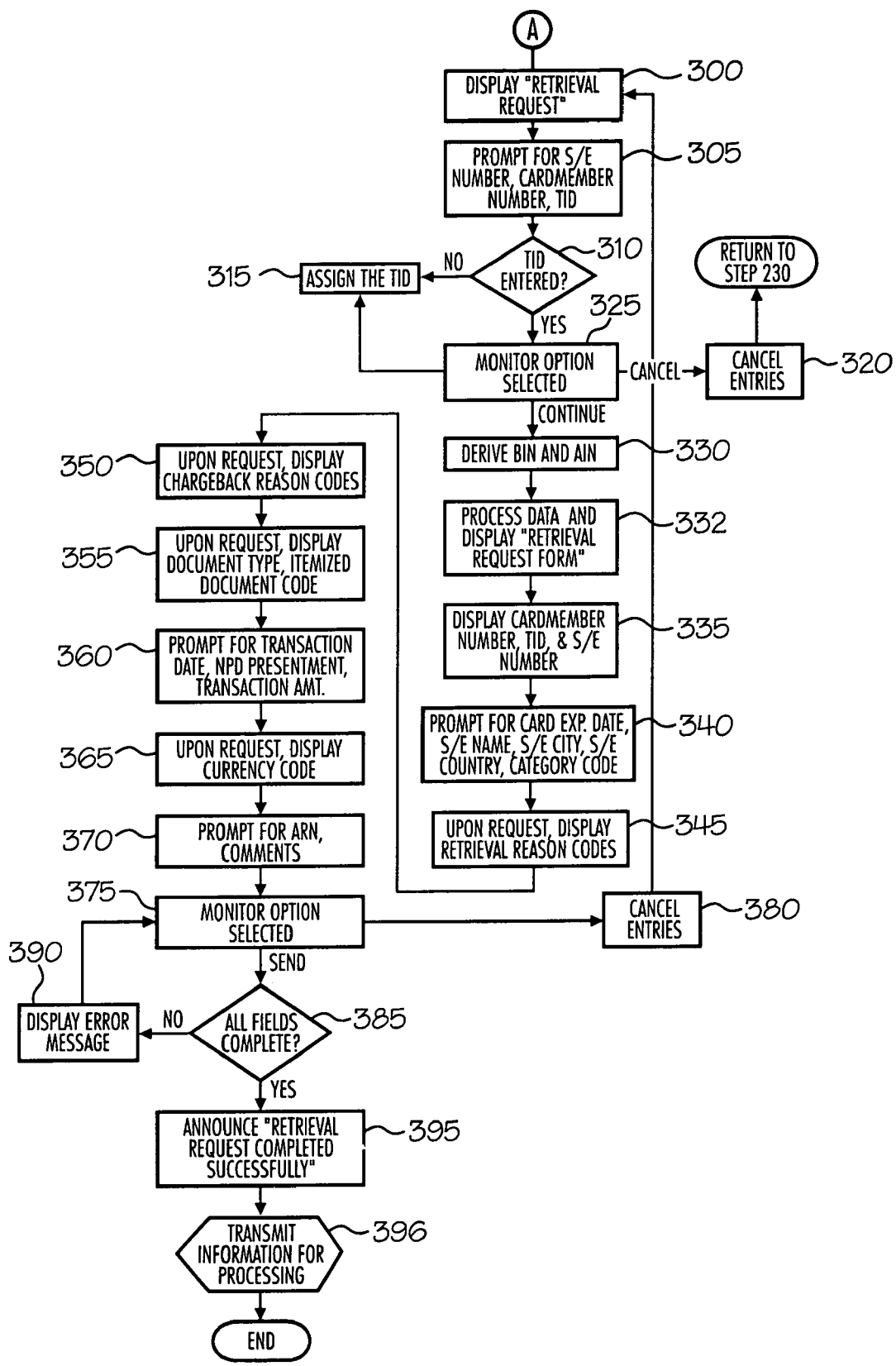
FIG. 3 is a continuation of FIG. 2 illustrating a "Retrieval Request" embodiment of the present invention.

Referring to FIG. 3, upon selection of "Retrieval Request," the program causes the display "Retrieval Request" (step 300). Throughout the form, the program prompts the Issuer to enter data with respect to the unresolved dispute. The Issuer is asked to provide information which will help the Acquirer to recognize the disputed matter and to promote a fast response time. The requested data can vary according to the dispute application, however, in the sake of brevity, the present invention is described with respect to one exemplary application for Issuers and Acquirers. The Issuer is asked to provide the S/E number, cardmember number and TID (transaction identifier which consists of an unique alphanumeric sequence) (step 305). The program identifies whether a TID was entered by the Issuer (step 310) and if not, the program will automatically assign the TID from a stored algorithm (step 315). The Issuer is next presented with an option which is monitored by the program (step 325). At this point, the Issuer may choose "cancel," which deletes the entries, cancels the current process (step 320) and returns the application to the previous screen (step 230).

Should the Issuer choose "continue", the program begins processing the entered data which includes, but not limited to, deriving both the BIN (bank identification number) from the entered cardmember number and the AIN (acquirer identification number) by matching the S/E number with a table stored on the server database (step 330). The program causes a display of "Retrieval Request Form" (step 332) and displays the previously entered data (step 335). The Issuer is asked to provide additional information about the card and S/E which can include, card expiration date, S/E's name, city and country, and the merchant category code (step 340). The merchant category code classifies the type of business product or service associated with the transaction. In a preferred embodiment, the program may suitably offer a menu of merchant category codes to be selected by the Issuer.

To facilitate data entry, a plurality of menu options, such as, for example, a "drop-down menu," are stored on the server. The Issuer can choose to have the menu options displayed by "clicking" the appropriate on-screen button. For instance, the Issuer can choose from a "drop-down menu" containing a list of retrieval reason codes (step 345). The drop-down menu offers the Issuer with a list of pre-written options from which the Issuer can simply "click-on" one of the options. This saves the Issuer entry time and further promotes fast and uniform data entry. Examples of retrieval reason codes which may display, include "the cardmember does not recognize this transaction" or "the cardmember requests a copy of the transaction for his personal records." Each retrieval reason code may be suitably associated with process timeframes.

A similar drop-down menu prompts the user to choose from a list of chargeback reason codes (step 350). "Chargeback" is the term used in the industry to indicate a reversal of a credit transaction which is charged-back to the Acquirer. Chargebacks and chargeback codes may include "goods and services not received" "missing or invalid signature," and "currency discrepancy." The chargeback codes may be associated with process timeframes and indexed by the program (similar to the retrieval reason codes). Additionally, a drop-down menu option prompts the Issuer to choose from a list of supporting documentation codes (step 355). The Issuer may desire a copy of a receipt of the cardmember's purchase, or the credit transaction data containing the details of the transaction carried out at the S/E.

Next, the program prompts the Issuer for entry of the transaction date, the network processing date of the transaction (NPD) and the transaction monetary amount (step 360). The Issuer can choose from a drop-down menu containing a list of currency codes (step 365). The currency code denotes the country of origin for the original transaction. The Issuer is also asked to enter the ARN (acquirer reference number) and any comments the Issuer may wish to include with the retrieval request form (step 370).

After the Issuer enters the appropriate data requested above, the program monitors the next option selected by the user (step 375). If the Issuer wants to cancel the current process, the Issuer chooses the "cancel" option and the application cancels the entries (step 380) and returns to the previous screen (step 300). Once satisfied with the entries, the Issuer chooses the "send" option. The program then verifies that all requested fields are complete (step 385). If field items are missing and/or contain invalid data (e.g., numeric data where alpha data is required), the program causes an error message display (step 390). If all fields are complete, the program announces "Retrieval Request Completed Successfully" (step 395) and transmits the completed form to the server for processing (step 396).

Inbox

As detailed earlier, the displayed "Form Selection" screen depends upon the User ID and password which are entered. Each user may be presented with only those functions which the user is authorized to use. From the "Form Selection" screen, users (e.g., Issuers and Acquirers) are also presented with an "Inbox" function. The inbox displays all the forms routed by the server to the user from other users wishing to initiate or respond to a dispute. For instance, the retrieval request detailed above may be routed by the server to the Acquirer's inbox which corresponds to the AIN entered by the Issuer. The program displays the data entered by the Issuer which will help the Acquirer to identify the particular dispute. In particular, the program causes the display of the TID, NPD, number of supporting documents attached to the form, the Issuer in dispute who completed the form and the type of form. The data in the inbox is made available for viewing and/or downloading by the Acquirer. Supporting documentation may be viewed by downloading from the application to the terminal's local hard drive or network (LAN). The Acquirer is not required to complete fields on the viewed form, but is simply alerted to the request for documentation (e.g., receipt copies) from the party in dispute. The Acquirer may then return to the "Form Selection" screen and choose a form to complete in response to the inbox request.

Fulfillment

Figure 4:
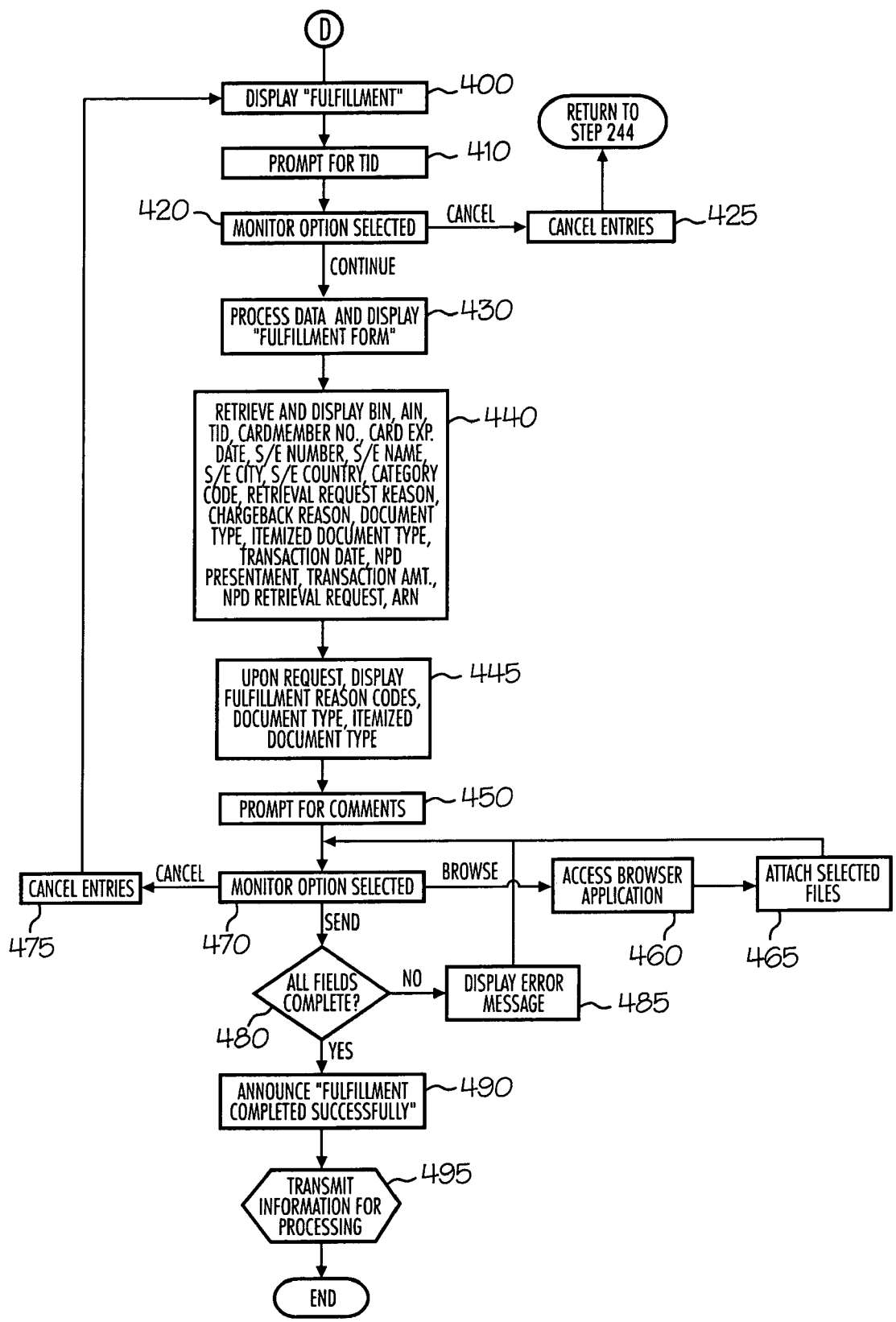
FIG. 4 is a continuation of FIG. 2 illustrating a "Fulfillment" embodiment of the present invention.

Referring now to FIG. 4, in response to the Issuer's retrieval request, the Acquirer may choose the "Fulfillment" option from the "Acquirer Form Selection" screen display. In general, the fulfillment form is a means for the Acquirer to provide the requested information or documentation back to the Issuer. The program causes the display of "Fulfillment" (step 400) and prompts the Acquirer to input the TID (step 410). The Acquirer has the option to continue or cancel the entry, which is monitored by the program (step 420). The Acquirer may choose the "cancel" option and the program will cancel the current process (step 425) and return the application to the previous screen (step 244).

Should the Acquirer choose "continue," the program will begin processing the entered data and cause the display "Fulfillment Form" (step 430). To assist the Acquirer in completing the form, the program displays the data previously entered by the Issuer. The program retrieves data from the previous form (retrieval request) and automatically populates any displayed fields on the fulfillment form which are identical to the data entered by the Issuer (e.g., cardmember number, S/E data, reason codes) (step 440). The program prompts the Acquirer to choose from a drop-down menu containing a list of fulfillment reason codes (step 445) which includes codes for "supporting documentation to follow" and "credit previously issued." The program may also accept any comments from the Acquirer (step 450).

The program monitors the next option selected by the Acquirer (step 470). For example, the Acquirer can choose "cancel" and the application cancels the entries (step 475) and returns to the previous screen (step 400).

In response to the Issuer's request, the Acquirer may need to supply supporting documentation. Referring back to FIG. 1, terminal 140 is preferably coupled to a document scanning device 180. The end-user may operate scanning device 180 to transform any supporting documentation into computer readable format. Typically, the scanned image will be transformed into a JPEG (joint photographic experts group) image file or .jpg file and stored on the user's local hard drive or network.

If the Acquirer has properly scanned documentation in support of the request, the Acquirer selects the "browse" option to review the stored image files. The program is suitably configured to launch access to a stored application such as, for example, WINDOWS EXPLORER® (step 460). If the Acquirer wishes to attach supporting scanned documentation, or any other type of documentation (e.g., word processing document) to the fulfillment form, the Acquirer selects the desired files from the local hard drive or network and the application causes the selected files to attach to the form (step 465).

Once satisfied with the entries, the Acquirer chooses the "send" option. The program verifies that all requested fields are complete (step 480) and if items are missing and/or invalid, the program causes an error message display (step 485). If complete/valid, the program announces "Fulfillment Completed Successfully" (step 490) and transmits the completed form within the server for processing (step 495).

Similar to the Inbox description above, the completed fulfillment form is routed back to the Issuer's access terminal for viewing and/or downloading. The program causes substantially the same display fields for the Issuer as for the Acquirer on the inbox screen. The Issuer may download and view any supporting documentation which the Acquirer has attached to the form.

First Chargeback

Figure 5:
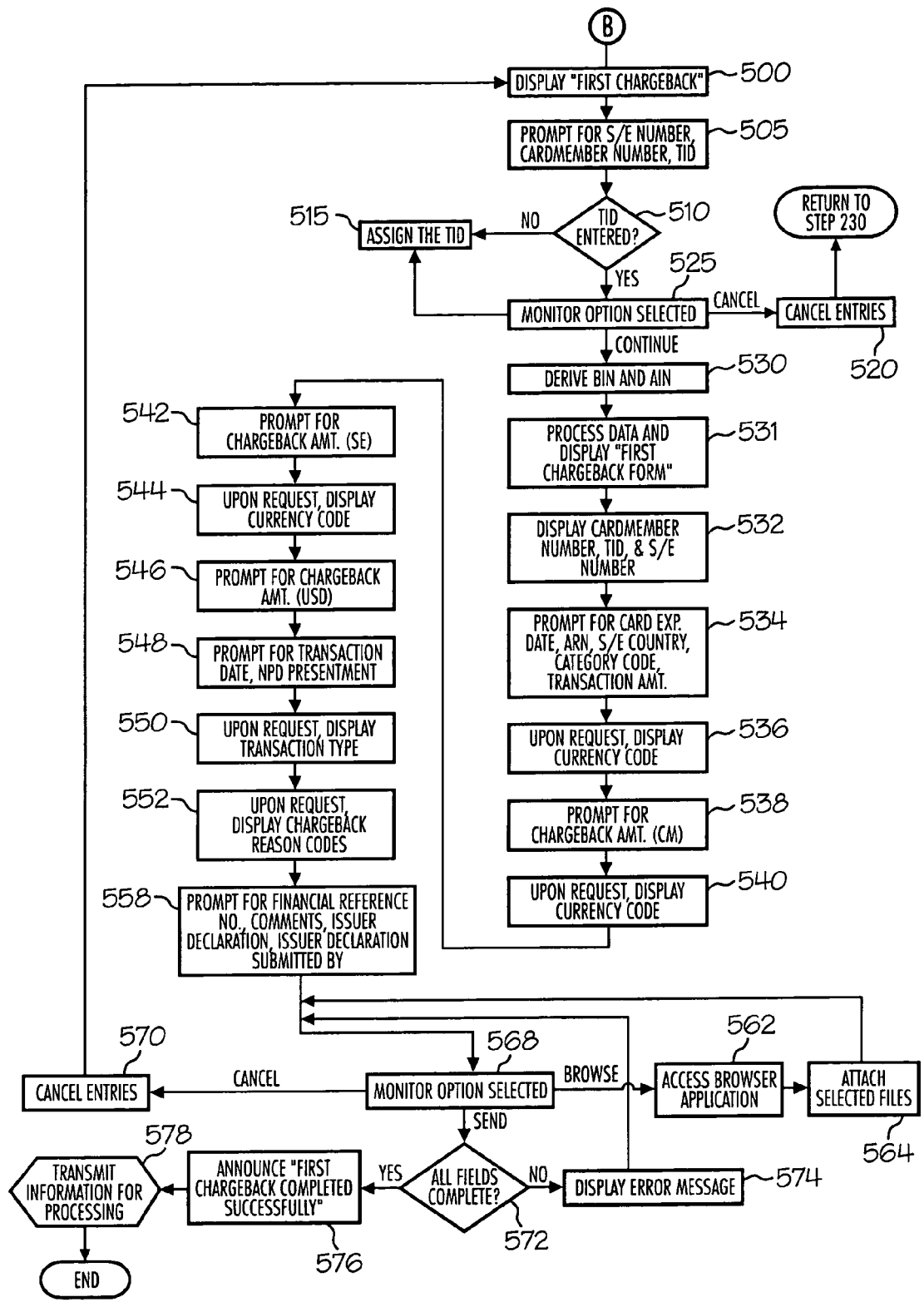
FIG. 5 is a continuation of FIG. 2 illustrating a "First Chargeback" embodiment of the present invention.

Another option available to the Issuer from the "Issuer Form Selection" display (step 230), is to choose "First Chargeback." The chargeback form will alert the Acquirer and subsequent financial personnel that the Issuer is requesting that the funds liability be transferred or "charged back" to the Acquirer. Referring to FIG. 5, once selected, the program causes a display of "First Chargeback" (step 500). (Steps 505-532 are substantially similar to steps 305-335 of the retrieval request FIG. 3.) The Issuer is asked for the S/E number, cardmember number and TID (step 505). The program identifies whether a TID was entered (step 510) and automatically assigns the TID from a stored algorithm (step 515) if entry is missing. The program monitors the next option selected by the Issuer (step 525). The Issuer, as previously disclosed, can cancel the entries (step 520) and return the application to the previous screen (step 230).

Should the Issuer choose "continue," the program begins processing the entered data such as, for example, deriving both the BIN and AIN (step 530) in substantially the same manner as previously disclosed. The program causes a display "First Chargeback Form" (step 531). To assist the Issuer in completing the form, the program automatically retrieves from the previous forms (e.g., retrieval request, fulfillment) identical data and populates the identical field entries that were entered by the previous end-user (either the Acquirer or the Issuer) (step 532). The Issuer is asked to enter the card expiration date, ARN, the S/E's name, city and country, the category code and the transaction amount (step 534). The program may suitably offer a drop-down menu containing a list of merchant category codes for the Issuer to choose from.

In the following steps, 536, 540, 544, 550 and 552, the program causes a display from a drop-down menu option for the Issuer to choose from. A drop-down menu button follows the monetary amounts the Issuer is requesting to chargeback to the Acquirer (step 534) (step 538) (step 542). The menu displays a list of currency codes for the Issuer to "click on" for each amount entered (step 536) (step 540) (step 544). Based upon the chargeback amount entered (step 538), the program performs a series of mathematical calculations for internal accounting purposes. These calculations are not displayed to the user. Another menu option prompts the Issuer to choose a transaction type (e.g., charge or credit) (step 550). The Issuer is also asked to provide a chargeback reason code from another drop-down menu (step 552). As previously disclosed, the chargeback reason codes may be associated with process timeframes and indexed as such by the program.

The program prompts the Issuer to provide information with respect to the chargeback which will help the Acquirer to identify the transaction, such as, for example, monetary chargeback amounts (step 546), the transaction date (step 548), NPD presentment, a financial reference number and any comments the Issuer may wish to include with the first chargeback form (step 558).

Based upon the chargeback reason code entered by Issuer, the Issuer may be asked to enter an Issuer declaration and the name of the person submitting the declaration (step 558). An Issuer declaration is a certification by the Issuer that any requisite conditions under the chargeback code has been met. Each code may have specific conditions which the Issuer must meet in order to properly use the code, for example, "that the card had been cancelled prior to the date of the chargeback," "provide the cardmember's cancellation confirmation number," or "provide the duplicate billing number." The program may index the dispute by the chargeback code entered by the Issuer.

The program monitors the next option selected by the Issuer (step 568). If the Issuer cancels the current process, the program deletes the entries (step 570) and returns to the previous screen (step 500). As previously discussed, the Issuer may wish to attach supporting documentation to the first chargeback form. The Issuer selects the "browse" option, reviews the files stored on the local hard drive or network, then selects the desired file(s). If the "browse" option is selected, the program is suitably configured to access an application, such as WINDOWS EXPLORER®, stored on the local hard drive or network (step 562). Upon selection of the desired file(s), the program causes the selected file(s) to attach to the form (step 564).

Once satisfied with the entries, the Issuer chooses the "send" option. The program verifies that all requested fields are complete (step 572) and if items are missing, the program causes an error message display (step 574). If no error message is displayed, the program announces "First Chargeback Completed Successfully" (step 576) and transmits the completed form within the server for processing (step 578).

The program is configured to route the dispute-related data entered by the Issuer on the first chargeback form to the Acquirer in dispute. During processing, (step 578) information is extracted from the form which aids the program in determining where to route the form. The Acquirer is alerted to the presence of the routed form with a display on the Acquirer's inbox screen.

Second Presentment

Figure 6:
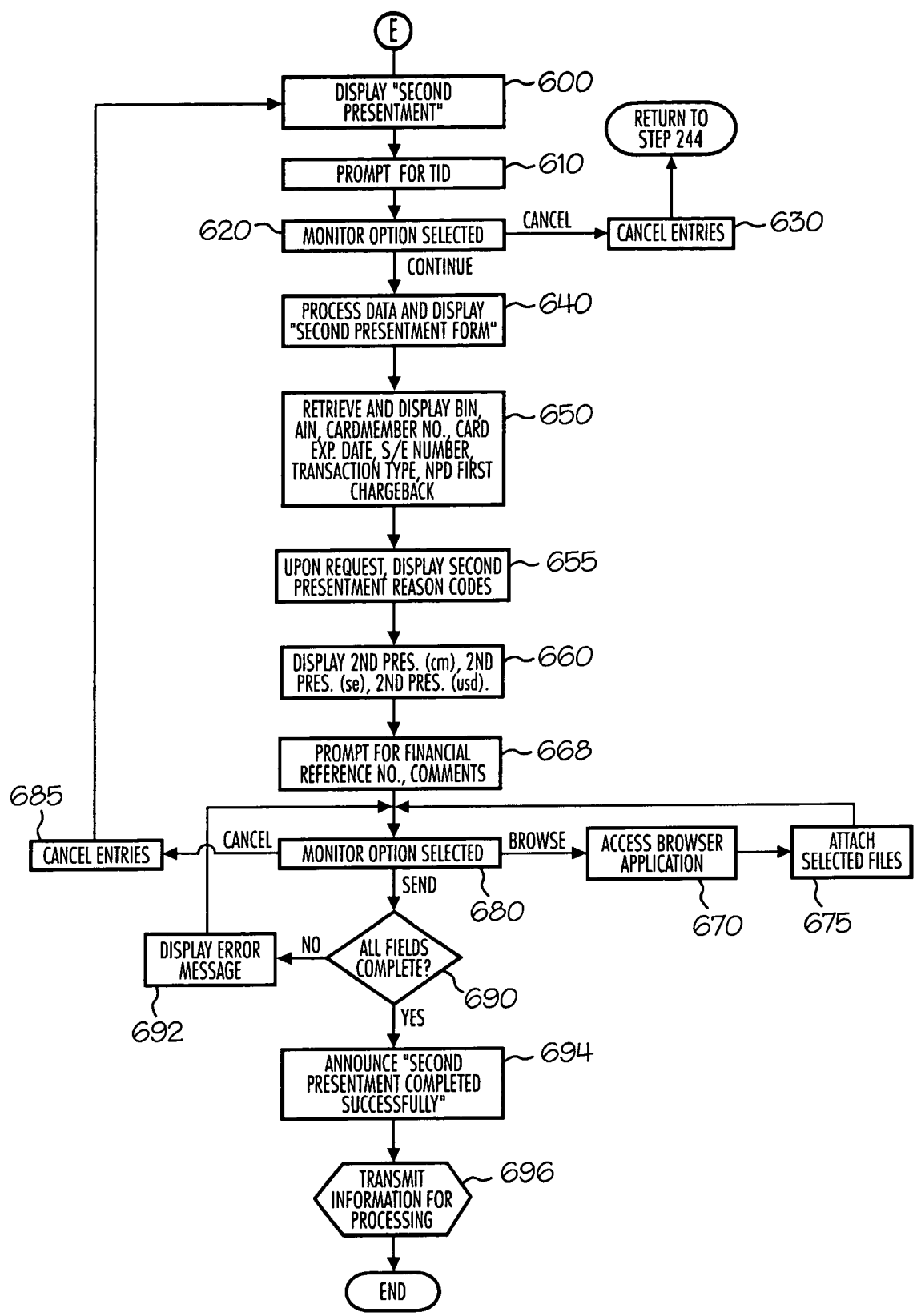
FIG. 6 is a continuation of FIG. 2 illustrating a "Second Presentment" embodiment of the present invention.

Typically, the Issuer completes the first chargeback form which is routed by the program on the server to the corresponding Acquirer. The Acquirer may refute the chargeback and present the transaction back to the Issuer. To present back, the Acquirer selects a "second presentment" option from the "Acquirer Form Selection" display (step 244). By presenting back or second presentment, the Acquirer is requesting that the funds liability be transferred back to the Issuer. Referring to FIG. 6, the program causes a display of "Second Presentment" (step 600) and prompts the user to input the TID (step 610). The next option selected by the Acquirer is monitored (step 620). The Acquirer may wish to cancel the entries by choosing "cancel," which causes the program to cancel the current process (step 630) and return the application to the previous screen (step 244).

Should the Acquirer choose "continue," the program begins processing the entered data and causes a display "Second Presentment Form" (step 640). The program retrieves data from a previous form and automatically populates the fields identical to the data entered by the Issuer on the first chargeback form (step 650). The program prompts the Acquirer to "click" a drop-down menu and select from a list of second presentment reason codes (step 655). The second presentment dollar amounts are displayed but may be changed by the Acquirer if they are incorrect or a different amount is desired (step 660). Based upon the second presentment (SE) dollar amount, the program performs a series of calculations for internal accounting purposes. The Acquirer then inputs the financial reference number and any comments the Acquirer may wish to include with the second presentment form (step 668).

The program monitors the Acquirer's next selection (step 680). (Steps 670-696 are substantially similar to steps 460-495 of the fulfillment form FIG. 4.) As previously disclosed, the Acquirer can "cancel," "browse" or "send" the form for processing. If the "cancel" option is chosen, the program cancels the entries (step 685) and returns to the previous screen (step 600). After the "send" option is chosen and all fields are complete, the program announces "Second Presentment Completed Successfully" (step 694) and transmits the completed form within the server for processing (step 696).

Final Chargeback

Figure 7:
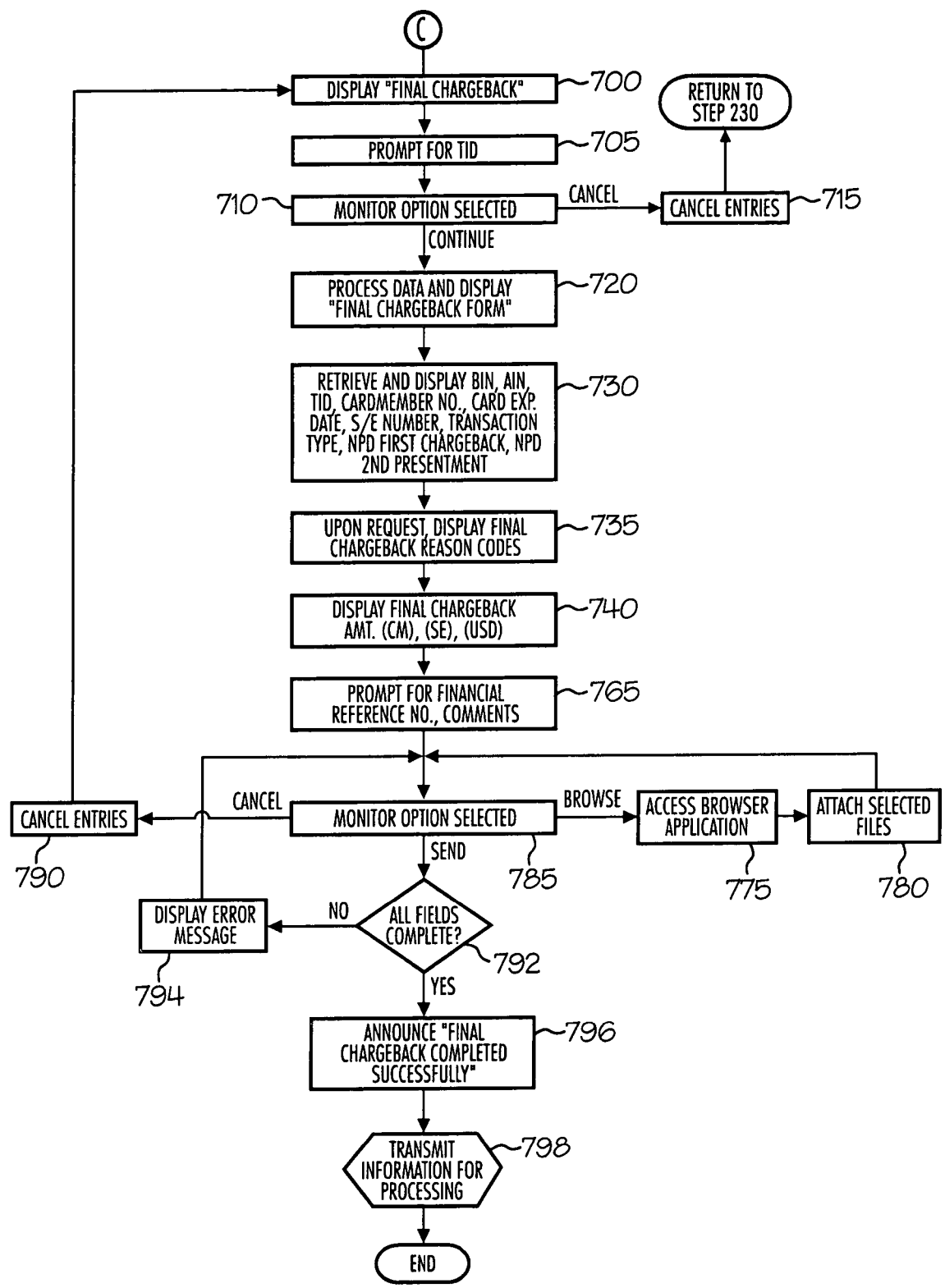
FIG. 7 is a continuation of FIG. 2 illustrating a "Final Chargeback" embodiment of the present invention.

Upon receipt and review of the second presentment form (as disclosed previously, the Issuer is notified of the form through the "inbox" function), the Issuer may decide to complete a "final chargeback" which is chosen from the "Issuer Form Selection" display (step 230). With reference to FIG. 7, the program causes the display of "Final Chargeback" (step 700) and prompts the user to input the TID (step 705). The next option selected by the Issuer is monitored (step 710). The Issuer can choose "cancel" or "continue" in a similar manner as previously disclosed (refer to first chargeback FIG. 5).

The "continue" option begins the processing of the entered data and causes a display of "Final Chargeback Form" (step 720). The application retrieves and automatically populates the fields identical to the data entered by the Issuer on the first chargeback form or by the Acquirer on the second presentment form (step 730) (step 740). The program performs mathematical calculations on the final chargeback amount (step 740) for internal accounting purposes. The program prompts the Issuer to choose from a list of final chargeback reason codes from a drop-down menu (step 735). The final chargeback reason codes may be the same or substantially similar to the first chargeback reason codes previously discussed. The program prompts the Issuer to input the financial reference number and any comments the Issuer may wish to include with the final chargeback form (step 765).

The program monitors the Issuer's next selection (step 785). (Steps 785-798 are substantially similar to steps 568-578 of the first chargeback form FIG. 5.) As previously disclosed, the Issuer can "cancel," "browse" or "send" the form for processing. If the "cancel" option is chosen, the application cancels the entries (step 790) and returns to the previous screen (step 700). After the "send" option is chosen and all fields are complete (step 792), the program announces "Final Chargeback Completed Successfully" (step 796) and transmits the completed form within the server for processing (step 798).

Administrative Operations

As previously disclosed, the present invention is conveniently described with reference to a transactional dispute between an Issuer and an Acquirer, however, one skilled in the art will recognize that the scope of the present invention can include other end-users, such as, for example, administrative and financial personnel.

Typically, Issuers and Acquirers request a User ID from an administrative operations center or similar centralized management. In an effort to maintain uniformity and control, generally only administrative personnel review, approve and issue the User ID and password. Each User ID and password are unique to each specific user and based upon the User ID and password, the program is configured to display only those forms or functions available to the user (e.g., Issuers may be presented with only Issuer forms and Acquirers may be presented with only Acquirer forms).

In one exemplary embodiment, administrative personnel (AP) access the program stored on the server to perform one of two functions, dispute handling or administrative. Unlike the other types of users, the AP may be able to access the forms and functions of other users. The dispute handling option (FIG. 2) allows the AP to choose from either the Issuer or Acquirer forms and complete a form on behalf and at the direction of a specific Issuer or Acquirer, thereby allowing the AP to initiate or respond to a credit dispute.

Figure 8:
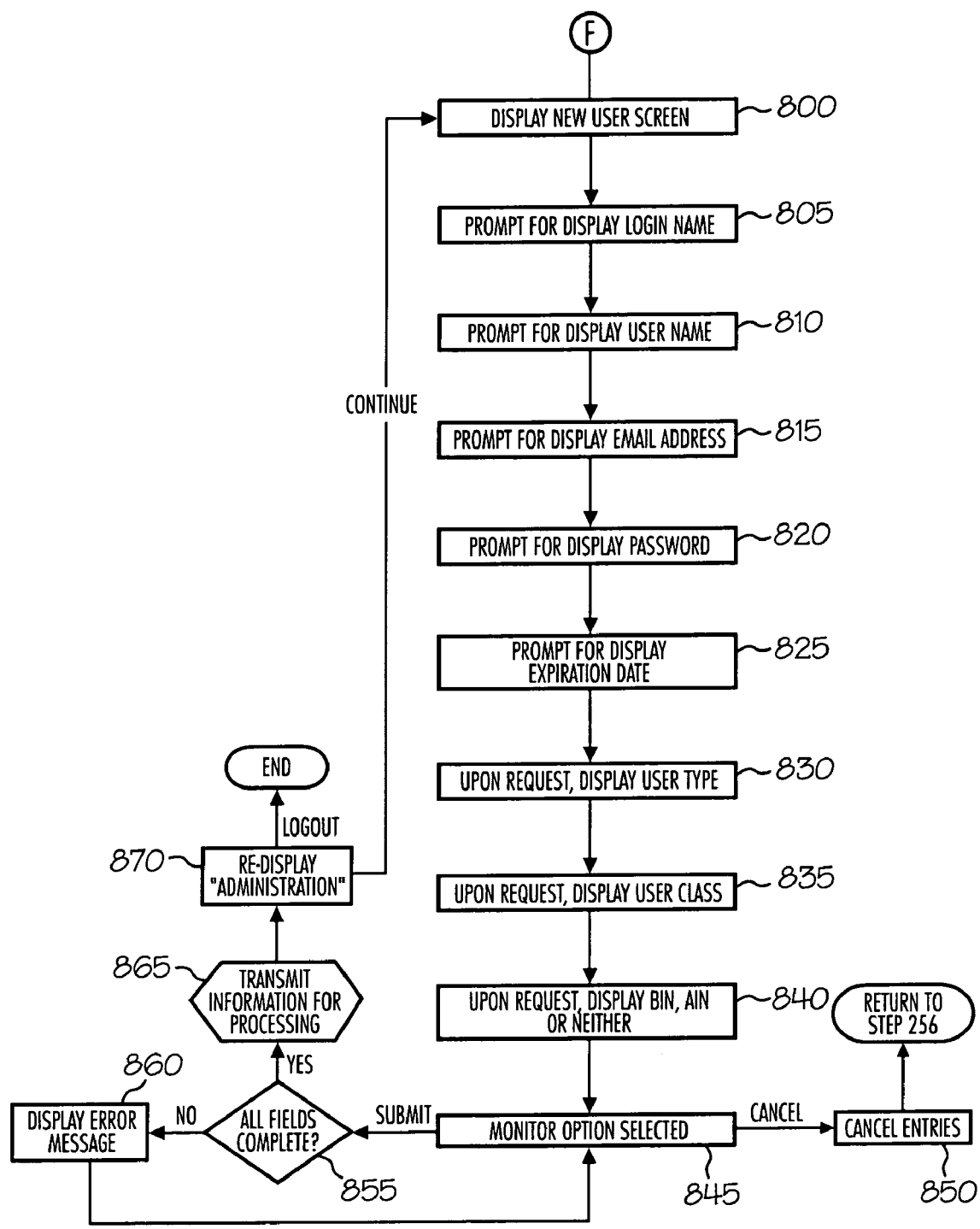
FIG. 8 is a continuation of FIG. 2 illustrating a new user embodiment of the present invention.

A second option which may be available to the AP includes performing User ID functions such as adding, deleting or modifying a User ID or access. Referring to FIG. 8, once the AP receives a request for a User ID and password, the AP can add the user, by choosing the "Add" option from the "Administration" screen. The program causes the new user screen to display (step 800) and prompts for information with respect to the new user. For instance, the AP is asked to provide the login name (step 805), user name (step 810), email address (step 815), password (step 820) and expiration date of the User ID (to be determined by AP) (step 825). Further information such as the user class and type (e.g., Issuer, Acquirer, AP, FP) (step 830)(step 835), and the BIN, AIN or neither (step 840) is also provided. The BIN may be needed if the new user is an Issuer, the AIN may be needed for an Acquirer, and neither number may be provided if the new user is an AP or a FP.

The program monitors the next option selected by AP (step 845). For example, the AP can choose "cancel" and the application cancels the entries (step 850) and returns to the "Administration" screen (step 256). The AP can "submit" the form, at which point the program verifies that all requested fields are complete (step 855) and if items are missing, the program causes an error message display (step 860). If complete, the program closes the current screen and transmits the information within the server for processing, which may include storage on the server database (step 865). The program redisplays the "Administration" screen (step 870) and prompts the AP to "continue" which allows the AP to add another user (step 805) or "logout" which ends the function.

Figure 9:
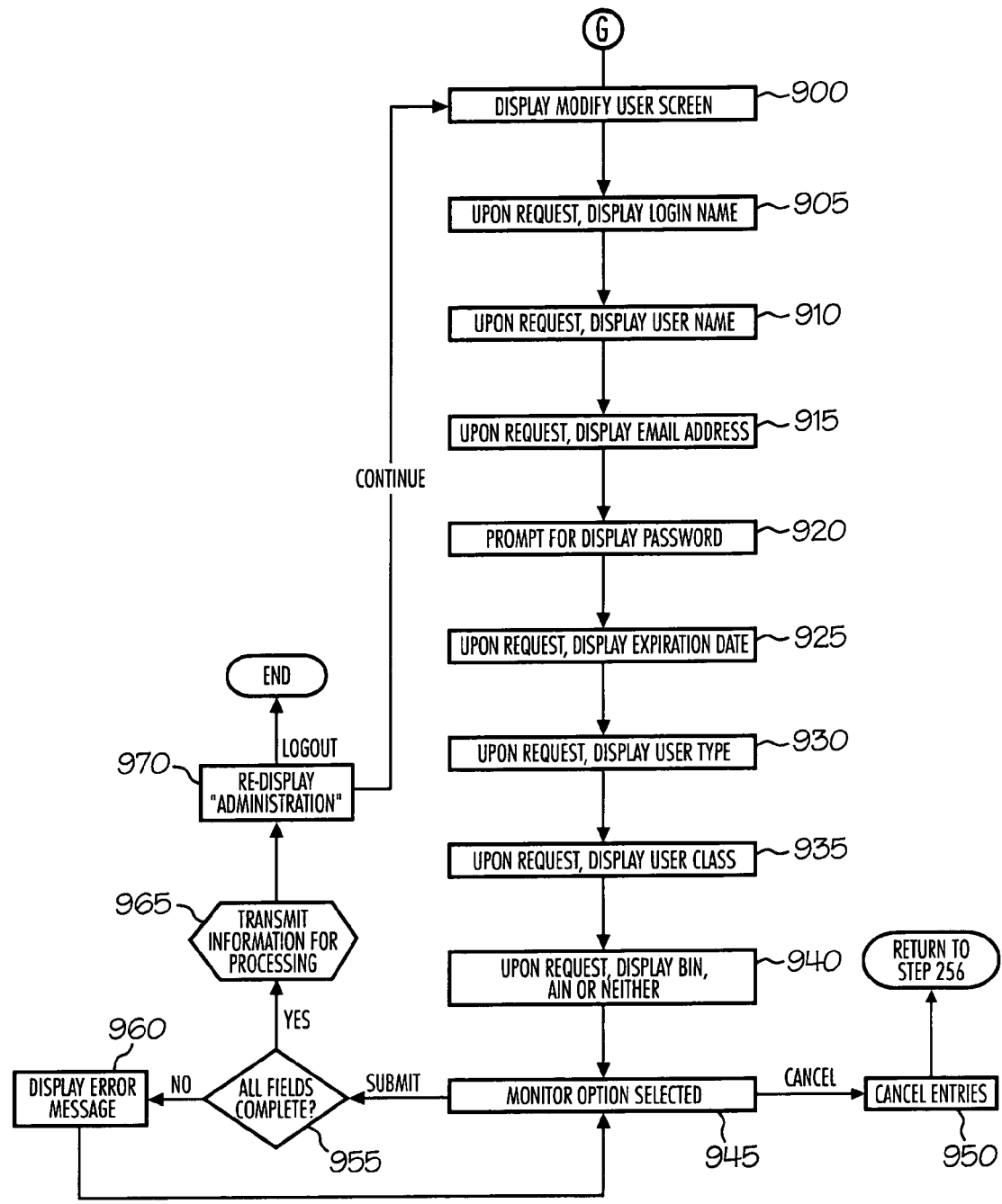
FIG. 9 is a continuation of FIG. 2 illustrating a modify user embodiment of the present invention.

With reference to FIG. 9, the AP can modify a user that already has a User ID and password. It may be necessary to change a user's type (e.g., from Issuer to Acquirer) or modify the User ID and password in any similar manner. Upon selection of "Admin," the program causes the "Administration" screen to display along with a list of all active and inactive users that have been assigned a User ID and password. The user list is retrieved from the database located on the server. The AP identifies a user from the list as the user to modify and "highlights" the user. Next, the AP chooses "Modify" from the "Administration" screen which causes the program to display the modify user screen (step 900). The AP is asked to provide information about the highlighted user (steps 905-940 are substantially similar to steps 805-840) and the AP can change the current status or data for the user at this time. The remaining program steps, 945-970, are substantially similar to steps 845-870 disclosed above for adding a new user. The modified user data can suitably be stored on the server database.

Figure 10:
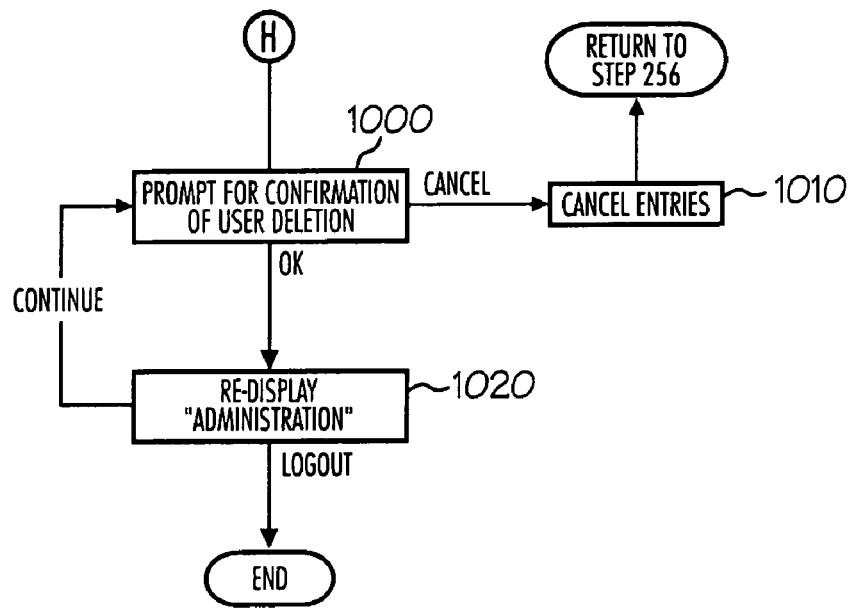
FIG. 10 is a continuation of FIG. 2 illustrating a delete user embodiment of the present invention.

Finally, as a third option in an exemplary embodiment, the AP may delete a user as illustrated in FIG. 10. From the "Administration" screen, the AP highlights the user to delete from the displayed list, then chooses "delete." The program prompts the AP for a confirmation of user deletion (step 1000), in other words, the program requests that the AP choose "cancel" (step 1010) (to cancel the entry and start over) or "ok" to delete the user from the list. Once deleted, the User ID may no longer be granted access to the web site located on the server, however, the user may remain on the list as an inactive user. The program redisplays the "Administration" screen (step 1020) which gives the AP the opportunity to "continue" and delete another user (step 1000) or "logout" and end the function.

In a preferred embodiment, from the "Administration" screen, the AP can write a text message to appear on the home page of other types of users including other AP. Typically, a message may include daily announcements, system failures or the like.

Financial Operations

Financial personnel (FP) perform settlement and funds exchange between the Issuers and Acquirers. In practice, an Issuer receives a complaint from a cardmember regarding a transaction which typically involves a monetary amount. The Issuer disputes the amount with the Acquirer by completing one or more on-line forms as previously disclosed. In one embodiment each form which can transfer liability from an Issuer to an Acquirer (e.g., first and final chargeback) or vice versa (e.g., second presentment) can be logged on a reporting system. The FP accesses the web site stored on the server and views the reports on a timely basis to reconcile or redistribute funds accordingly.

In a preferred embodiment, the FP accesses the web site stored on the server and chooses "Reports" option from the home page (FIG. 2). There may be any number of reports available for the FP to view, but in the sake of brevity, only three will discussed herein. One report may list all the first and final chargeback forms completed for the day. The FP can view or download the report and transfer the liability from the Issuer listed to the Acquirer listed on the form. A second report may list all the second presentments for the day. Again, the FP can view the second presentment report and transfer the liability from the Acquirer listed to the Issuer listed on the form.

A third report may list all the transactions that were sent to wrong Acquirer's inbox for the day. On occasion, a form completed by an Issuer may be misrouted by the server, or a wrong AIN may be entered by the Issuer, resulting in the form being sent to the wrong Acquirer. The Acquirer can reject the form request from the Issuer and transmit the original form back to the web site/server and subsequent AP for rerouting. The FP may have already transferred liability to the Acquirer prior to the Acquirer or anyone else realizing the misrouting error. In this case, the FP transfers the liability back to the original Issuer once the report, indicating the misrouting has been generated.

Documents Only

Users, (e.g., Issuers and Acquirers) may complete or begin a dispute handling process using another method not disclosed by the present invention, such as for example, on an internal network or infrastructure. However, many internal networks or infrastructures have inadequate methods for transfer of supporting documentation or alternatively, no file transfer capabilities at all. This presents a problem for the Issuers and Acquirers using an infrastructure who desire to transmit documentation in support of a pending dispute To overcome the file transfer problem associated with initiating or responding to a dispute on an internal network or infrastructure, Issuers and Acquirers can transmit documentation in support of a dispute process originating on an infrastructure with the speed and efficiency of the Internet. The present invention, as previously disclosed, provides users, such as Issuers and Acquirers, a system and method for real-time transfer of supporting documentation with respect to a transactional credit dispute.

Users (Issuers and Acquirers) may choose a "Documents Only" form from the "Form Selection" display. The "documents only" form is a supporting documentation exchange between users in dispute. In one embodiment, documentation such as ROC, hotel folio, and any additional duplicate transaction record which may facilitate the dispute process can be scanned, stored and retrieved in a similar manner as previously disclosed (see the discussion under FULFILLMENT). Scanned documentation may then be exchanged between the Issuer and the Acquirer using the "documents only" form.

Whether the user, for example an Issuer, completes a "documents only" form or one of the previously disclosed forms (e.g., first and final chargeback) all required information will be supplied by either the Issuer on the "documents only" form or automatically retrieved by the program from a previous entry by the Issuer. For example, the Issuer may begin the dispute process over an internal infrastructure, which is not embodied by the present invention. The Issuer may be asked to provide similar information as disclosed in the "retrieval request," "first chargeback" and "final chargeback" forms (except for the "browse" option to attach supporting documentation) which is then stored on the infrastructure's database. The Issuer can then use the previously disclosed system and method to transmit any supporting documentation. The server, as previously disclosed, having a database, is configured to link to the infrastructure's database and search the infrastructure's database to find the Issuer's previous entry which initialized the dispute in question. The server then retrieves the previously entered data for the dispute.

Figure 11:
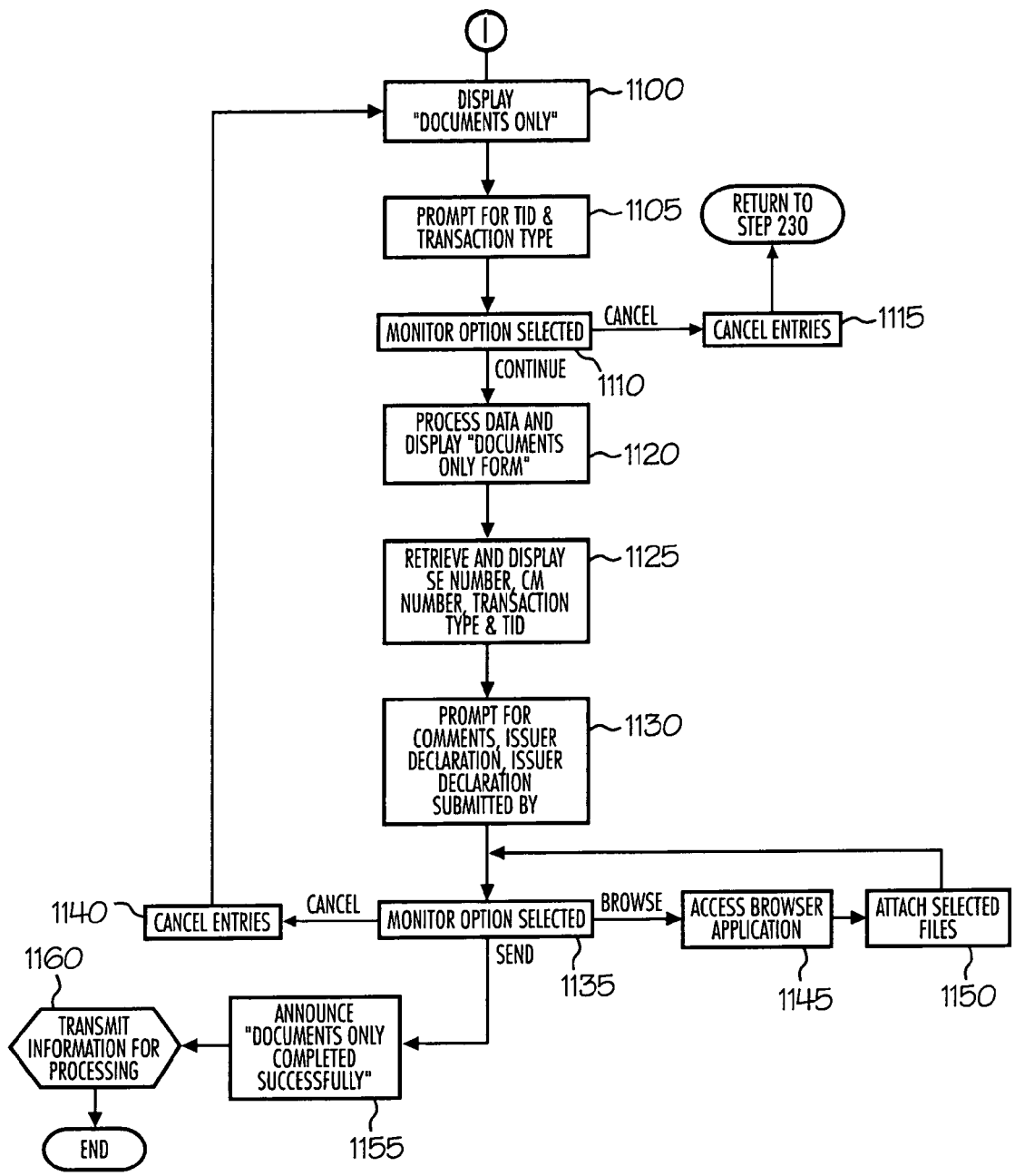
FIG. 11 is a continuation of FIG. 2 illustrating a "Documents Only" embodiment of the present invention.

With reference to FIG. 11, the "documents only" form and function will become clearer. After the Issuer has initiated a dispute on the infrastructure, or similar internal network, the Issuer may want to include supporting documentation. The Issuer can access the disclosed web site and choose "Documents Only" from the "Issuer Form. Selection" display (step 230) (See, FIG. 2). Once selected, the program causes the display "Documents Only" (step 1100) and the Issuer is asked to provide the TID and transaction type, which may include first or final chargeback (step 1105). The program monitors the "continue" and "cancel" options (step 1110). If the Issuers wants to cancel the entries (step 1115)) and start over or quit the program, the "cancel" option is chosen and the program returns to the previous screen (step 230).

If the Issuer chooses "continue," the program begins processing the entered data and causes the display "Documents Only Form" (step 1120). The processing step includes, but is not limited to, matching the entered TID with a previously entered TID stored on the server 100 database corresponding to the initial entry made by the Issuer. To assist the Issuer in completing the "documents only" form, the program displays information retrieved from the infrastructure's database pertaining to the dispute in question (step 1125)).

Based upon the chargeback reason code entered by the Issuer on infrastructure, the Issuer may be asked to enter an Issuer declaration and the name of the person submitting the declaration (step 1130) in a substantially similar manner as previously disclosed (see step 558). The program may index the dispute by the chargeback reason code entered by the Issuer.

The program monitors the next option selected by the Issuer (step 1135). If the Issuer "cancels" the current process (step 1140), the program deletes the entries and returns to the previous screen (step 1100). As discussed, the Issuer chooses the "documents only" to supplement a previously entered transaction on, for example, an infrastructure. The Issuer chooses the "browse" option causing the program to access an application, such as WINDOWS EXPLORER®, stored on the Issuer's local hard drive or network (step 1145). The Issuer views the stored files (see the discussion under FULFILLMENT) and selects the desired file(s) to attach (step 1150). Once satisfied with the entries on the form, the Issuer chooses the "send" option. The program announces "Documents Only Completed Successfully" (step 1155) and transmits the completed form within the server for processing (step 1160).

The program is configured to route the dispute-related documentation selected by the Issuer and attached by the program to the Acquirer. The Acquirer is alerted to the presence of the routed form with a display on the Acquirer's inbox screen.

Figure 12:
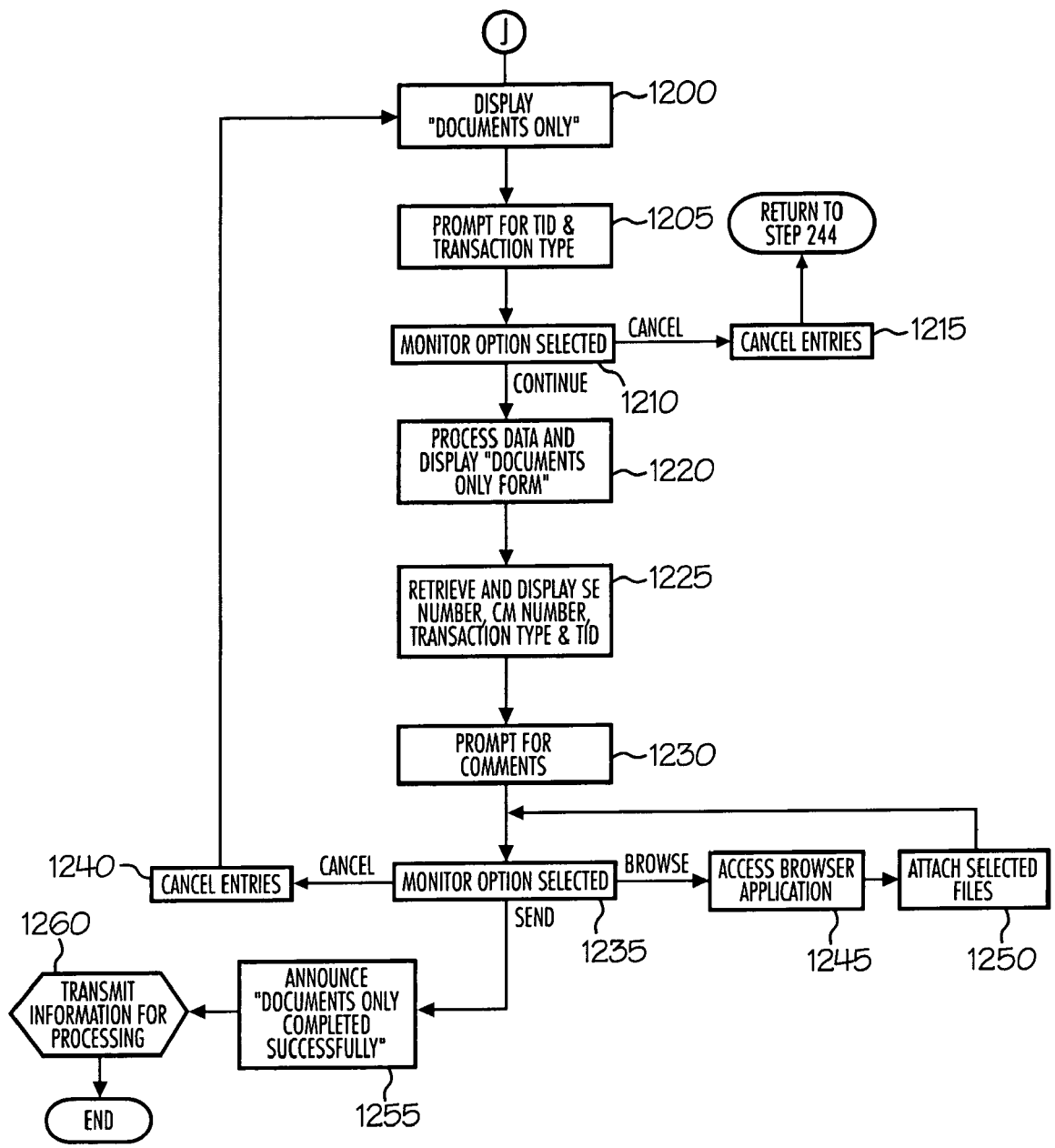
FIG. 12 is a continuation of FIG. 2 illustrating another "Documents Only" embodiment of the present invention.

For substantially the same reasons discussed for the Issuer, the Acquirer may wish to transmit supporting documentation outside the infrastructure using the system and methods of the present invention. Referring to FIGS. 2 and 12, the Acquirer selects the "Documents Only" form from the "Acquirer Form Selection" display (step 244) causing the program to display "Documents Only" (step 1200). The Acquirer is asked to enter the TID and transaction type (e.g., fulfillment and second presentment) (step 1205).

In one exemplary embodiment, transmission of document and form data outside the infrastructure may use specialized data interchange. Similarly, in alternative embodiments, submission and display of forms data may also use this specialized data interchange. In a particular embodiment, this data interchange may use Extensible Markup Language (XML). XML provides the ability to create well-formed and valid representations of data that may be validated and exchanged between a variety of different systems. The specific interchange format of this data interchange of the present invention may be specified by either an XML Schema or Document Type Definition (DTD). This DTD or Schema identifies the exact data elements of the interchange, plus the grammar rules for when and where these elements may appear in the XML data that is exchanged according to the methods of the invention. An exemplary system of the invention may include software that performs processing of the XML data. For example, the software may perform inter-conversion of XML data to and from any of the data entry forms, data display forms, document-only transmissions, and infrastructure.

The program monitors the "continue" and "cancel" options (step 1210). If the Acquirer wants to cancel the entries (step 1215) and start over or quit the program, the "cancel" option is chosen and the program returns to the previous screen (step 244). If the Acquirer chooses "continue," the program begins processing the entered data and causes the display "Documents Only Form" (step 1220). To assist the Acquirer in completing the "documents only" form, the program displays information retrieved from the server 100 database, as previously disclosed, pertaining to the dispute in question (step 1225).

The Acquirer may include any comments (step 1230) before selecting the next option (step 1235). The Acquirer can "cancel" the entries (step 1240), "browse" the stored files (steps 1245 and 1250 are substantially similar to steps 1145 and 1150), or "send" the form. If "send" is chosen, the program announces "Documents Only Completed Successfully" (step 1255) and transmits the form to the server for processing (step 1260). The server routes the form to the Issuer in dispute and alerts the Issuer to the presence of the form.

The on-line system and method described and illustrated provides an automated and real-time environment for processing a dispute. In addition, the code-based indexing system provides an efficient process for prioritizing disputes and effectively reducing the overall dispute settling time.

The present invention is described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely an exemplary application for the invention.

It should be appreciated that the particular implementations shown and described herein are illustrative of the invention and its best mode and are not intended to otherwise limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The present invention has been described above with reference to preferred embodiments. However, those skilled in the art having read this disclosure will recognize that changes and modifications may be made to the preferred embodiments without departing from the scope of the present invention. For example, similar forms may be added without departing from the spirit of the present invention. These and other changes or modifications are intended to be included within the scope of the present invention, as expressed in the following claims.

The invention claimed is:

1. A method, implemented on a computer network, for facilitating the input of information into a form comprising at least one of an Issuer dispute resolution form and an Acquirer dispute resolution form, to streamline a resolution of a financial dispute relating to a transaction card transaction, the method comprising the steps of:

performing a purchase transaction between a cardmember and a merchant using a transaction account issued to said cardmember by an Issuer;

thereafter providing notice by said cardmember to said Issuer that said cardmember disputes said purchase transaction;

a user, wherein said user has an Issuer access right initiating, in response to said notice from said cardmember, a predetermined resolution protocol, wherein the purpose of said protocol is to resolve an ensuing dispute between said Issuer and an Acquirer with respect to a backend processing transaction associated with said purchase transaction, and further wherein said backend transaction involves said Acquirer collecting money from said cardmember and coordinating payment to said merchant for said purchase transaction in accordance with a preexisting backend processing agreement between said Issuer and said Acquirer; wherein said resolution protocol comprises the steps of:

selecting, by said user having said Issuer access right, said Issuer dispute resolution form, a first form, wherein said Issuer dispute resolution form is independent of a type of said financial dispute, and said Issuer dispute resolution form is available to users with an Issuer access right;

inputting into said first form, by said user having said Issuer access right, information relating to said disputed purchase transaction to thereby generate from said first form a first Issuer form;

electronically transmitting said first Issuer form from said user having said Issuer access right to a user having an Acquirer access right;

successively selecting additional ones of said form, by said user having said Issuer access right and said user having said Acquirer access right, respectively, to thereby generate additional Issuer forms and Acquirer forms;

electronically exchanging said additional Issuer forms and Acquirer forms in accordance with said resolution protocol; and resolving said backend transaction dispute between said Issuer and said Acquirer using said additional Issuer forms and said Acquirer forms, in accordance with said resolution protocol.

2. The method of claim 1, further comprising the steps of:
retrieving a stored file; and
attaching said stored file to said additional Issuer forms and Acquirer forms.

3. The method of claim 1, wherein said Issuer forms comprise at least one of a Retrieval Request, a First Chargeback and a Final Chargeback; and said Acquirer forms comprise at least one of a Fulfillment and a Presentment.

4. The method of claim 1 further comprising:
selecting, by said user having said Acquirer access right, a second form, and inputting into said second form information responsive to said first Issuer form to thereby generate a first Acquirer form; and, electronically transmitting said first Acquirer form from said user having said Acquirer access right to said user having said Issuer access right.

5. A method executed in a network computer system for facilitating communication between an Issuer and an Acquirer in the context of resolving a post-transactional dispute, wherein the dispute is between the Issuer and the Acquirer and the dispute is related to an executed credit transaction between a cardmember and a merchant, the executed credit transaction involving a transaction account associated with the cardmember, the network computer system having a server and at least one access terminal, the method comprising the steps of:

accepting at said server a first User ID and password from a user with an Issuer access right at a first access terminal;

retrieving from said server a pre-defined set of Issuer dispute handling forms having pre-defined content which coincide with said first User ID;

displaying said pre-defined set of Issuer forms at said first access terminal;

selecting, by said user having said Issuer access right, one of said pre-defined set of Issuer forms at said first access terminal, wherein said pre-defined set of Issuer forms is independent of a type of said post-transactional dispute, and said pre-defined set of Issuer forms is available to users with said Issuer access right;

receiving input entered on said selected one of said Issuer forms at said first access terminal;

transmitting within said network said selected one of said Issuer forms to a user with an Acquirer access right;

notifying said user having said Acquirer access right at a second access terminal of said selected one of said Issuer forms;

accepting at said server a second User ID and password from said user having said Acquirer access right at said second access terminal;

retrieving from said server a set of Acquirer dispute handling forms having pre-defined content which coincide with said second User ID;

displaying said set of Acquirer forms at said second access terminal;

selecting, by said user having said Acquirer access right, one of said Acquirer forms at said second access terminal;

receiving input entered on said selected one of said Acquirer forms at said second access terminal;

transmitting within said network said one of said Acquirer forms to said user having said Issuer access right; and, notifying said user having said Issuer access right at said first access terminal of said one of said Acquirer forms.

6. The method of claim 5, further comprising the steps of:
retrieving a stored file from said server; and
attaching said stored file to said one of said Issuer forms and Acquirer forms.

7. The method of claim 5, further comprising the steps of:
receiving at said second access terminal a scanned document in computer readable format;
storing said scanned document on said server; and
attaching said scanned document to one of said Issuer forms and Acquirer forms.

8. The method of claim 5, further comprising the steps of:
accepting at said server a third-party User ID and password from a third-party user at a third access terminal;
retrieving from said server a set of reports which coincide with said third-party User ID;
displaying said set of reports at said third access terminal; and
receiving instructions from said third party user to transfer monetary liability to at least one of said Issuer from said Acquirer and said Acquirer from said Issuer.

9. The method of claim 5 wherein said accepting at said server steps comprise matching said first User ID and password, and said second User ID and password, with information stored in a database accessible to said server.

* * * * *